United States Patent
Nomura et al.

(10) Patent No.: US 10,035,278 B2
(45) Date of Patent: Jul. 31, 2018

(54) DEVICE AND METHOD FOR PRODUCING SEPARATOR ROLL

(71) Applicant: SUMITOMO CHEMICAL COMPANY, LIMITED, Tokyo (JP)

(72) Inventors: Kiyomu Nomura, Niihama (JP); Tatsuya Kataoka, Niihama (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 131 days.

(21) Appl. No.: 14/780,572

(22) PCT Filed: May 26, 2015

(86) PCT No.: PCT/JP2015/065008
§ 371 (c)(1),
(2) Date: Sep. 28, 2015

(87) PCT Pub. No.: WO2016/103753
PCT Pub. Date: Jun. 30, 2016

(65) Prior Publication Data
US 2016/0325447 A1    Nov. 10, 2016

(30) Foreign Application Priority Data
Dec. 25, 2014  (JP) .................................. 2014-263592

(51) Int. Cl.
*H01M 10/0525*  (2010.01)
*H01M 2/14*  (2006.01)
(Continued)

(52) U.S. Cl.
CPC ............... *B26D 1/025* (2013.01); *B26D 1/02* (2013.01); *B26D 1/03* (2013.01); *B26D 3/00* (2013.01);
(Continued)

(58) Field of Classification Search
CPC .... H01M 10/0525; H01M 2/14; H01M 2/145; H01M 2/16; H01M 2/1685; B26D 1/025;
(Continued)

(56) References Cited

U.S. PATENT DOCUMENTS

2002/0132162 A1* 9/2002 Takata .................. B26D 1/025
                                                         429/129
2010/0155522 A1    6/2010 Arimitsu et al.

FOREIGN PATENT DOCUMENTS

JP      11-180605 A     7/1999
JP    2000-11982 A     1/2000
(Continued)

OTHER PUBLICATIONS

Communication dated Aug. 23, 2016 from the Japanese Patent Office in counterpart application No. 2016-124854.
(Continued)

*Primary Examiner* — Karie O'Neill Apicella
(74) *Attorney, Agent, or Firm* — Sughrue Mion, PLLC

(57) ABSTRACT

A wrinkle or misaligned winding caused in a separator roll is inhibited. In a slitting apparatus (6), a conveying direction of a first separator (12a) is changed to a first take-up roller (70U) side by a direction changing roller (68), the first separator is conveyed via a take-up assisting roller (69) which is provided between the direction changing roller and a first touch roller (81U) so as to shorten a roller-to-roller distance to the first touch roller, and the first separator which is being wound is pressed onto a take-up surface by the first touch roller.

3 Claims, 7 Drawing Sheets

(51) Int. Cl.
  *B26D 1/02*    (2006.01)
  *B26D 7/26*    (2006.01)
  *B26D 3/00*    (2006.01)
  *B65H 20/02*   (2006.01)
  *B65H 35/02*   (2006.01)
  *B65H 18/26*   (2006.01)
  *B26D 1/03*    (2006.01)
  *B26D 7/18*    (2006.01)
  *B65H 18/02*   (2006.01)
  *H01M 2/16*    (2006.01)

(52) U.S. Cl.
  CPC ............. *B26D 7/18* (2013.01); *B26D 7/2614* (2013.01); *B65H 18/021* (2013.01); *B65H 18/26* (2013.01); *B65H 20/02* (2013.01); *B65H 35/02* (2013.01); *H01M 2/145* (2013.01); *B65H 2301/4148* (2013.01); *B65H 2301/41282* (2013.01); *B65H 2801/72* (2013.01); *H01M 2/1653* (2013.01); *H01M 2/1686* (2013.01); *H01M 10/0525* (2013.01)

(58) Field of Classification Search
  CPC .......... B26D 7/26; B26D 7/2614; B26D 3/00; B26D 1/02; B65H 20/02; B65H 35/02; B65H 18/26
  See application file for complete search history.

(56) References Cited

FOREIGN PATENT DOCUMENTS

| | | | |
|---|---|---|---|
| JP | 2002-273684 A | 9/2002 | |
| JP | 2012166896 A | 9/2012 | |
| JP | 2013-254595 A | 12/2013 | |
| JP | 2013254595 A | * 12/2013 | .............. H01M 4/04 |
| KR | 10-2004-0085634 A | 10/2004 | |
| KR | 10-2009-0057256 A | 6/2009 | |

OTHER PUBLICATIONS

Communication dated Dec. 30, 2016 from the Korean Intellectual Property Office in counterpart Application No. 10-2015-7026449.
Japanese Office Action for JP 2015-527721 dated Sep. 1, 2015.
Communication dated Mar. 2, 2017, from the State Intellectual Property Office of the P.R.C., in counterpart Chinese application No. 201580000458.X.
Communication dated Feb. 2, 2016, from the Japanese Patent Office in counterpart application No. 2015-527721.
International Search Report for PCT/JP2015/065008 dated Sep. 1, 2015.
International Preliminary Report on Patentability corresponding to International Application No. PCT/JP2015/065008, dated Jul. 6, 2017.
Communication dated Jul. 20, 2017, from the Korean Intellectual Property Office in counterpart Korean application No. 10-2015-7026449.

* cited by examiner

DEVICE AND METHOD FOR PRODUCING SEPARATOR ROLL

CROSS REFERENCE TO RELATED APPLICATIONS

This application is a National Stage of International Application No. PCT/JP2015/065008 filed May 26, 2015, claiming priority based on Japanese Patent Application No. 2014-263592 filed Dec. 25, 2014, the contents of all of which are incorporated herein by reference in their entirety.

TECHNICAL FIELD

The present invention relates to a method for producing a separator roll that is used in a battery such as a lithium-ion battery.

BACKGROUND ART

As the slitting apparatus, for example, a slitting apparatus disclosed in Patent Literature 1 is known. The technique disclosed in Patent Literature 1 is aimed at providing a method for slitting a battery separator while hardly causing defects such as a pore and a rip in a slitting step. In view of this, the technique disclosed in Patent Literature 1 focuses on tension applied to the separator after being slit.

CITATION LIST

Patent Literature

[Patent Literature 1]
Japanese Patent Application Publication Tokukai No. 2002-273684 (Publication date: Sep. 25, 2002)

SUMMARY OF INVENTION

Technical Problem

A battery separator is supplied to a battery production process in a form of a roll obtained by winding the slit separator on a core. In the battery production process, the separator wound off from the roll is to be laminated with a positive electrode film and a negative electrode film which are similarly and separately wound off from respective rolls.

However, in a case where a separator is wound off from a roll in which the separator has been wound up with a wrinkle or misaligned winding, the separator thus wound off is more likely to meander. In such a case where the separator meanders, a defect is caused in lamination with the positive electrode film and the negative electrode film. Under the circumstances, the roll of the separator is highly demanded to involve less wrinkles and less misaligned winding.

Note that the positive electrode film and the negative electrode film are also demanded to involve less wrinkles and less misaligned winding but the demand is particularly high for the separator. This is because of reasons below: that is, in a process of producing the separator, a stretching process is carried out, and therefore a film thickness is more likely to be uneven, and accordingly the unevenness in film thickness may cause a wrinkle and misaligned winding. Moreover, the separator which is porous is soft, and therefore a wrinkle is more likely to occur.

As above described, the technique disclosed in Patent Literature 1 focuses on tension applied to the separator after the slitting in order to hardly causing defects such as a pore and a rip in a slitting step, and Patent Literature 1 does not disclose a measure to inhibit a wrinkle and misaligned winding.

The present invention is accomplished in view of the problems, and its object is to provide a method for producing a separator roll which can inhibit a wrinkle or misaligned winding that is caused when a separator after being slit is wound.

Solution to Problem

A method in accordance with an aspect of the present invention for producing a separator roll includes the steps of: (a) slitting an original sheet of a battery separator in a lengthwise direction so as to divide the original sheet into at least a first separator and a second separator; (b) changing conveying directions of the first separator and the second separator by at least one direction changing roller toward a first take-up section and a second take-up section, respectively; (c) taking up the first separator and the second separator by the first take-up section and the second take-up section, respectively, the first take-up section and the second take-up section being arranged in a positional relation of above and below; (d) pressing the first separator and the second separator, which are being wound, onto respective take-up surfaces by a first touch roller and a second touch roller, respectively; and (e) conveying the first separator via a first take-up assisting roller which is provided between the direction changing roller and the first touch roller so as to shorten a roller-to-roller distance to the first touch roller.

A method in accordance with an aspect of the present invention for slitting a separator includes the steps of: (A) slitting an original sheet of a battery separator in a lengthwise direction so as to divide the original sheet into at least a first separator and a second separator; (B) changing conveying directions of the first separator and the second separator by at least one direction changing roller toward a first take-up section and a second take-up section, respectively; (C) taking up the first separator and the second separator by the first take-up section and the second take-up section, respectively, the first take-up section and the second take-up section being arranged in a positional relation of above and below; (D) pressing the first separator and the second separator, which are being wound, onto respective take-up surfaces by a first touch roller and a second touch roller, respectively; and (E) conveying the first separator via a first take-up assisting roller which is provided between the direction changing roller and the first touch roller so as to shorten a roller-to-roller distance to the first touch roller.

Advantageous Effects of Invention

According to an aspect of the present invention, it is possible to inhibit a wrinkle or misaligned winding caused in a first separator.

DESCRIPTION OF EMBODIMENTS

[Basic Configuration]

The following discusses in order a lithium-ion secondary battery, a separator, a heat-resistant separator, a method for producing the heat-resistant separator, a slitting apparatus, and a cutting device.

(Lithium-Ion Secondary Battery)

A nonaqueous electrolyte secondary battery, typically, a lithium-ion secondary battery has a high energy density, and therefore, currently widely used not only as batteries for use in devices such as personal computers, mobile phones, and mobile information terminals, and for use in moving bodies such as automobiles and airplanes, but also as stationary batteries contributing to stable power supply.

Figure 1:
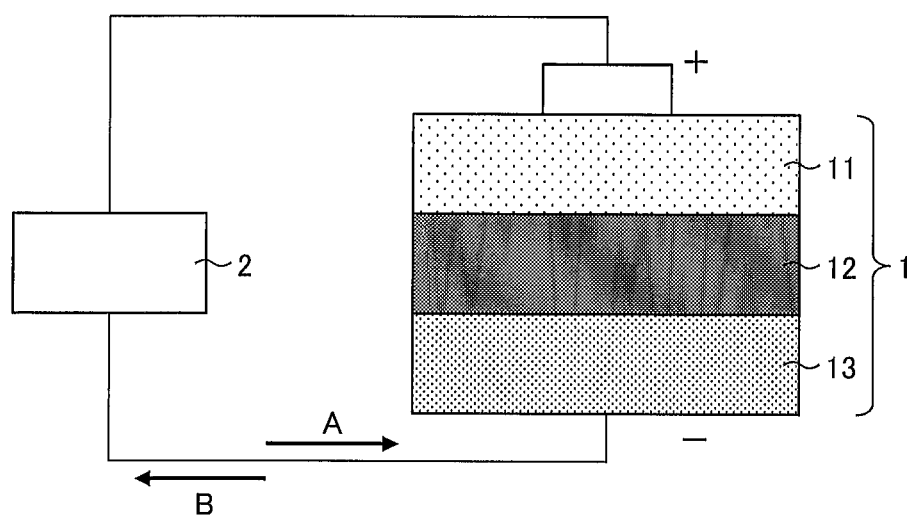
FIG. 1 is a schematic view illustrating a cross sectional configuration of a lithium-ion secondary battery.

FIG. 1 is a schematic view illustrating a cross sectional configuration of a lithium-ion secondary battery 1.

As illustrated in FIG. 1, the lithium-ion secondary battery 1 includes a cathode 11, a separator 12, and an anode 13. Between the cathode 11 and the anode 13, an external device 2 is connected outside the lithium-ion secondary battery 1. Then, while the lithium-ion secondary battery 1 is being charged, electrons move in a direction A. On the other hand, while the lithium-ion secondary battery 1 is being discharged, electrons move in a direction B.

(Separator)

The separator 12 is provided so as to be sandwiched between the cathode 11 which is a positive electrode of the lithium-ion secondary battery 1 and the anode 13 which is a negative electrode of the lithium-ion secondary battery 1. The separator 12 is a porous film which separates the cathode 11 and the anode 13, allowing lithium ions to move between the cathode 11 and the anode 13. The separator 12 contains, for example, polyolefin such as polyethylene or polypropylene as a material.

Figure 2A:
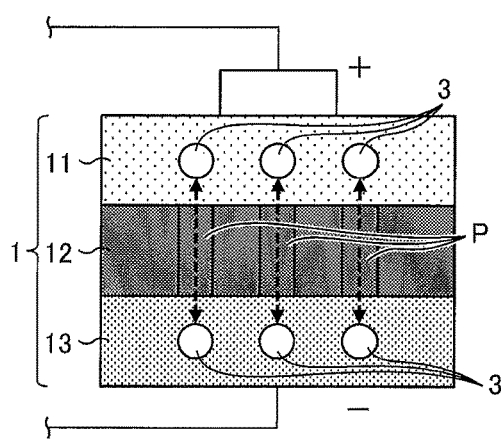
FIGS. 2A, 2B, and 2C are schematic views illustrating details of a configuration of the lithium-ion secondary battery illustrated in FIG. 1.
Figure 2B:
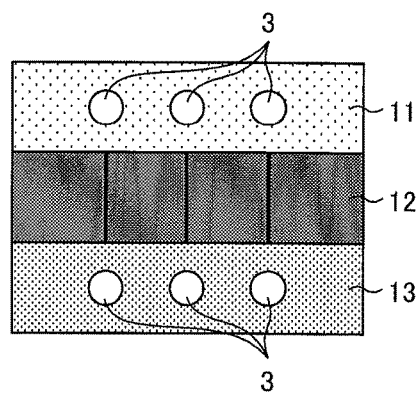
Figure 2C:
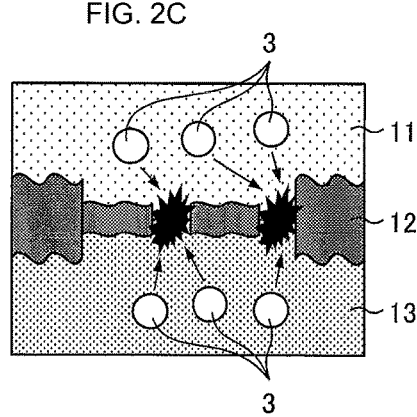

FIGS. 2A, 2B and 2C are schematic views illustrating details of the configuration of the lithium-ion secondary battery 1 illustrated in FIG. 1. FIG. 2A illustrates a normal configuration. FIG. 2B illustrates a state in which a temperature of the lithium-ion secondary battery 1 has risen. FIG. 2C illustrates a state in which a temperature of the lithium-ion secondary battery 1 has sharply risen.

As illustrated in FIG. 2A, the separator 12 is provided with many pores P. Normally, lithium ions 3 in the lithium-ion secondary battery 1 can move back and forth through the pores P.

However, there are, for example, cases in which the temperature of the lithium-ion secondary battery 1 rises due to excessive charging of the lithium-ion secondary battery 1, a high current caused by short-circuiting of the external device, or the like. In such cases, the separator 12 melts or softens and the pores P are blocked as illustrated in FIG. 2B. As a result, the separator 12 shrinks. This stops the movement of the lithium ions 3, and consequently stops the above temperature rise.

However, in a case where a temperature of the lithium-ion secondary battery 1 sharply rises, the separator 12 suddenly shrinks. In this case, as illustrated in FIG. 2C, the separator 12 may be destroyed. Then, the lithium ions 3 leak out from the separator 12 which has been destroyed. As a result, the lithium ions 3 do not stop moving. Consequently, the temperature continues rising.

(Heat-Resistant Separator)

Figure 3A:
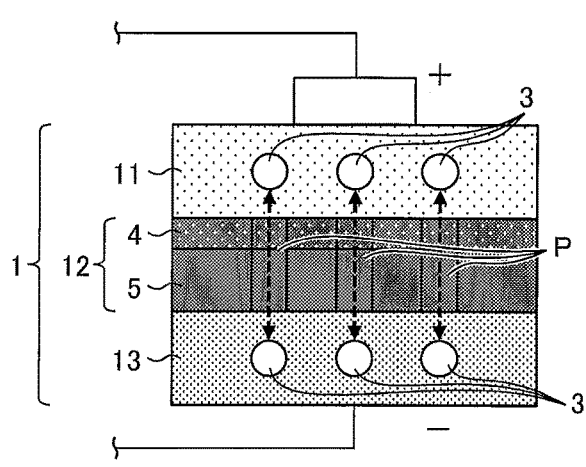
FIGS. 3A and 3B are schematic views illustrating another configuration of the lithium-ion secondary battery illustrated in FIG. 1.
Figure 3B:
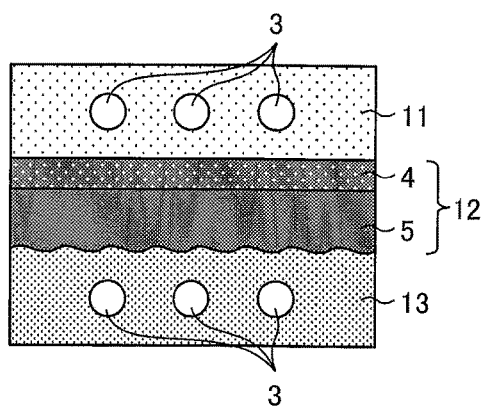

FIGS. 3A and 3B are schematic views illustrating another configuration of the lithium-ion secondary battery 1 illustrated in FIG. 1. FIG. 3A illustrates a normal configuration, and FIG. 3B illustrates a state in which a temperature of the lithium-ion secondary battery 1 has sharply risen.

As illustrated in FIG. 3A, the separator 12 can be a heat-resistant separator that includes a porous film 5 and a heat-resistant layer 4. The heat-resistant layer 4 is laminated on a surface of the porous film 5 which surface is on a cathode 11 side. Note that the heat-resistant layer 4 can alternatively be laminated on a surface of the porous film 5 which surface is on an anode 13 side, or both surfaces of the porous film 5. Further, the heat-resistant layer 4 is provided with pores which are similar to the pores P. Normally, the lithium ions 3 move back and forth through the pores P and the pores of the heat-resistant layer 4. The heat-resistant layer 4 contains, for example, wholly aromatic polyamide (aramid resin) as a material.

As illustrated in FIG. 3B, even in a case where the temperature of the lithium-ion secondary battery 1 sharply rises and as a result, the porous film 5 melts or softens, the shape of the porous film 5 is maintained because the heat-resistant layer 4 supports the porous film 5. Therefore, such a sharp temperature rise results in only melting or softening of the porous film 5 and consequent blocking of the pores P. This stops movement of the lithium ions 3 and consequently stops the above-described excessive discharging or excessive charging. In this way, the separator 12 can be prevented from being destroyed.

(Production Steps of the Heat-Resistant Separator)

How to produce the heat-resistant separator of the lithium-ion secondary battery 1 is not specifically limited. The heat-resistant separator can be produced by a well-known method. The following discussion assumes a case where the porous film 5 contains polyethylene as a main material. However, even in a case where the porous film 5 contains another material, the similar steps can still be applied to production of the separator 12.

For example, it is possible to employ a method including the steps of first forming a film by adding a plasticizer to a thermoplastic resin, and then removing the plasticizer with an appropriate solvent. For example, in a case where the porous film 5 is made of a polyethylene resin containing ultrahigh molecular weight polyethylene, it is possible to produce the separator 12 by the following method.

This method includes (1) a kneading step of obtaining a polyethylene resin composition by kneading a ultrahigh molecular weight polyethylene and an inorganic filler such as calcium carbonate, (2) a rolling step of forming a film with the polyethylene resin composition, (3) a removal step of removing the inorganic filler from the film obtained in the step (2), and (4) a stretching step of obtaining the porous film 5 by stretching the film obtained in the step (3).

In the removal step, many fine pores are provided in the film. The fine pores of the film stretched in the stretching step become the above-described pores P. The porous film 5 formed as a result is a polyethylene microporous film having a prescribed thickness and a prescribed air permeability.

Note that in the kneading step, 100 parts by weight of the ultrahigh molecular weight polyethylene, 5 parts by weight to 200 parts by weight of a low-molecular weight polyolefin having a weight-average molecular weight of 10000 or less, and 100 parts by weight to 400 parts by weight of the inorganic filler can be kneaded.

Thereafter, in a coating step, the heat-resistant layer 4 is formed on a surface of the porous film 5. For example, on the porous film 5, an aramid/NMP (N-methylpyrrolidone) solution (coating solution) is applied, and thereby, the heat-resistant layer 4 that is an aramid heat-resistant layer is formed. The heat-resistant layer 4 can be provided on only one surface or both surfaces of the porous film 5. Alternatively, the heat-resistant layer 4 can be formed by using a mixed solution containing a filler such as alumina/carboxymethyl cellulose for coating.

A method for coating the porous film 5 with a coating solution is not specifically limited as long as uniform wet coating can be performed by the method. The method can be a conventionally well-known method such as a capillary coating method, a spin coating method, a slit die coating method, a spray coating method, a dip coating method, a roll coating method, a screen printing method, a flexo printing method, a bar coater method, a gravure coater method, or a die coater method. The heat-resistant layer 4 has a thickness which can be controlled by adjusting a thickness of a coating wet film and a solid-content concentration in the coating solution.

It is possible to use a resin film, a metal belt, a drum or the like as a support with which the porous film 5 is fixed or transferred in coating.

As described above, it is possible to produce the separator 12 (heat-resistant separator) in which the heat-resistant layer 4 is laminated on the porous film 5. Thus produced separator is wound on a cylindrical core. Note that a subject to be produced by the above production method is not limited to the heat-resistant separator. The above production method does not necessarily include the coating step. In a case where the method includes no coating step, the subject to be produced is a separator that does not have a heat-resistant layer.

(Slitting Apparatus)

The heat-resistant separator or the separator having no heat-resistant layer (hereinafter, referred to as "separator") preferably has a width (hereinafter, referred to as "product width") suitable for application products such as the lithium-ion secondary battery 1. However, for improving productivity, the separator is produced so as to have a width that is equal to or larger than a product width. Then, after having been once produced so as to have a width equal to or larger than the product width, the separator is slit into a separator (s) having the product width.

Note that the "separator width" means a dimension of the separator in a direction substantially perpendicular to a lengthwise direction and a thickness direction of the separator. In the description below, a wide separator having not yet been slit is referred to as an "original sheet" while particularly a separator having been slit is referred to as a "slit separator". Moreover, "slit" means to cut off a separator in a lengthwise direction (i.e., a direction in which a film flows in production, MD: machine direction), and "cut" means to cut the separator in a transverse direction (TD). The transverse direction (TD) means a direction that is substantially perpendicular to the lengthwise direction (MD) and the thickness direction of the separator.

Figure 4A:
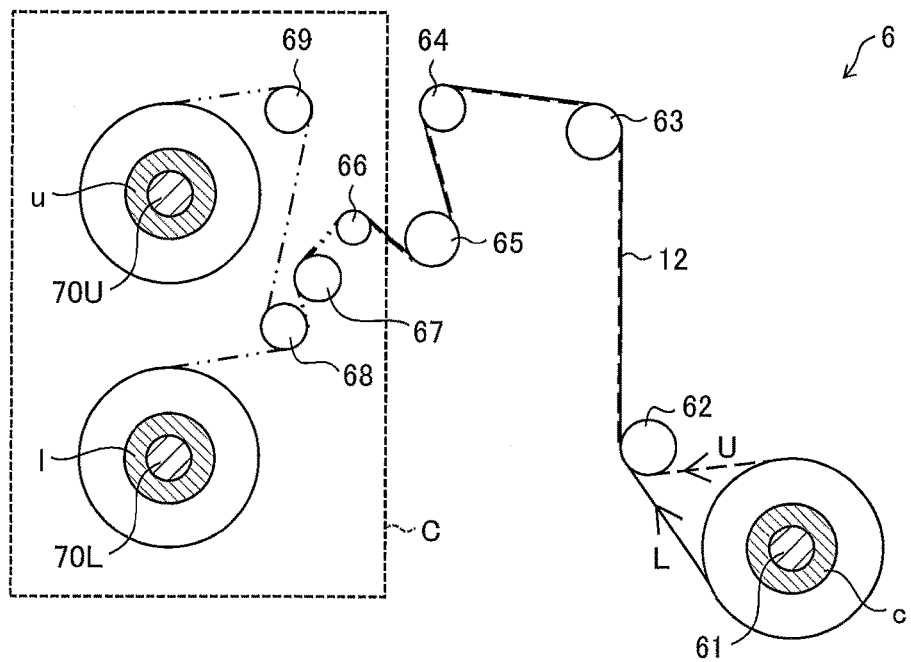
FIGS. 4A and 4B are schematic views illustrating a configuration of a slitting apparatus for slitting the separator.
Figure 4B:
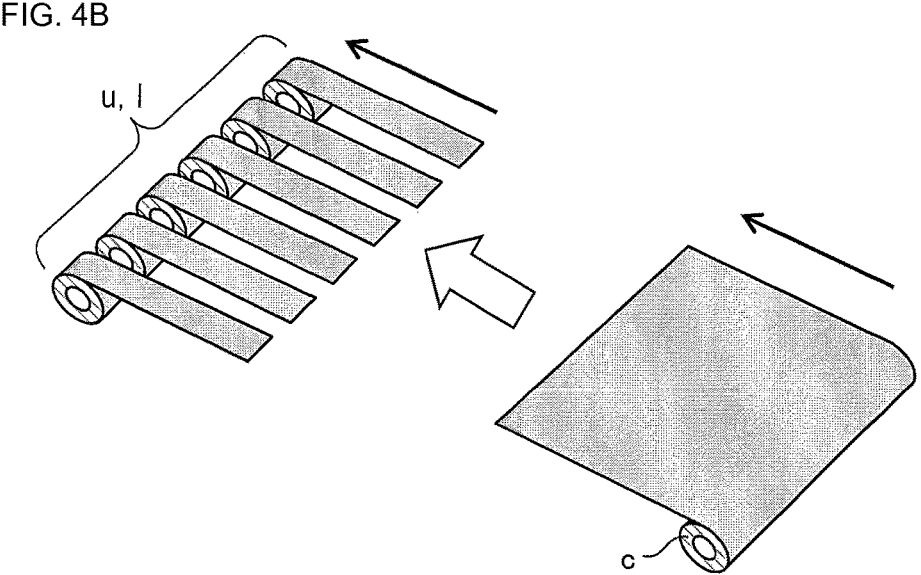

FIGS. 4A and 4B are schematic views illustrating a configuration of a slitting apparatus 6 for slitting the separator. FIG. 4A illustrates an entire configuration, and FIG. 4B illustrates an arrangement before and after slitting the original sheet.

As illustrated in FIG. 4A, the slitting apparatus 6 includes a rotatably-supported cylindrical wind-off roller 61, rollers 62 to 69, and take-up rollers 70U and 70L. The slitting apparatus 6 is further provided with the cutting device 7 described later.

(Before Slitting)

In the slitting apparatus 6, a cylindrical core c on which the original sheet is wrapped is fit on the wind-off roller 61. As illustrated in FIG. 4B, the original sheet is wound off from the core c to a route U or L. Thus unwound original sheet is conveyed to the roller 68 via the rollers 63 through 67. In the step of conveying the unwound original sheet, the original sheet is slit into slit separators.

(After Slitting)

As illustrated in FIG. 4B, some of the slit separators are wound on respective cylindrical cores u (bobbin) fit on the take-up roller 70U. Meanwhile, the others of the slit separators are wound on respective cores 1 (bobbin) fit on the take-up roller 70L. Note that each of the slit separators wound into a roll form is referred to as a "separator roll".

(Cutting Device)

Figure 5A:
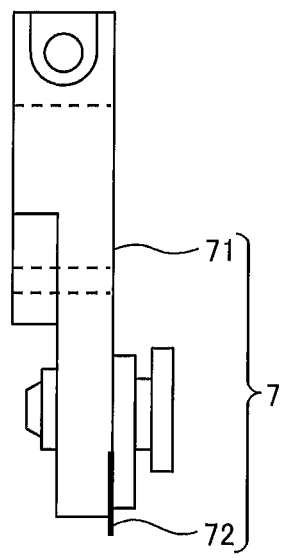
FIG. 5A is a side view and FIG. 5B is a front view illustrating a configuration of a cutting device of the slitting apparatus illustrated in FIGS. 4A and 4B.
Figure 5B:
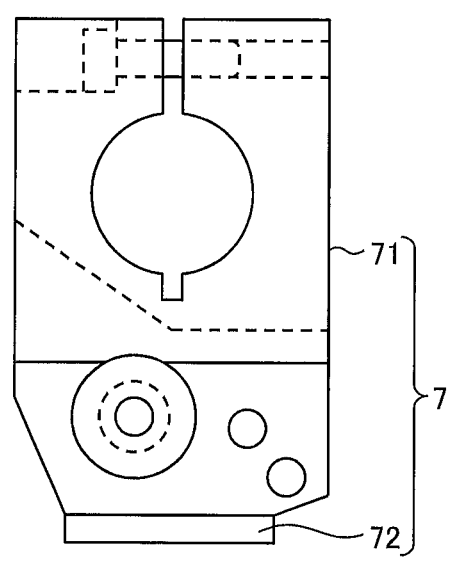

FIGS. 5A and 5B are views illustrating a configuration of the cutting device 7 of the slitting apparatus 6 as illustrated in FIG. 4A. FIG. 5A is a side view of the cutting device 7, and FIG. 5B is a front view of the cutting device 7.

As illustrated in FIG. 5A and FIG. 5B, the cutting device 7 includes a holder 71 and a blade 72. The holder 71 is fixed to a housing or the like provided in the slitting apparatus 6. The holder 71 holds the blade 72 in a manner such that the blade 72 and the original sheet of the separator being conveyed have a fixed positional relation. The blade 72 has a finely sharpened edge and slits the original sheet of the separator by using this edge.

Embodiment 1

Figure 6:
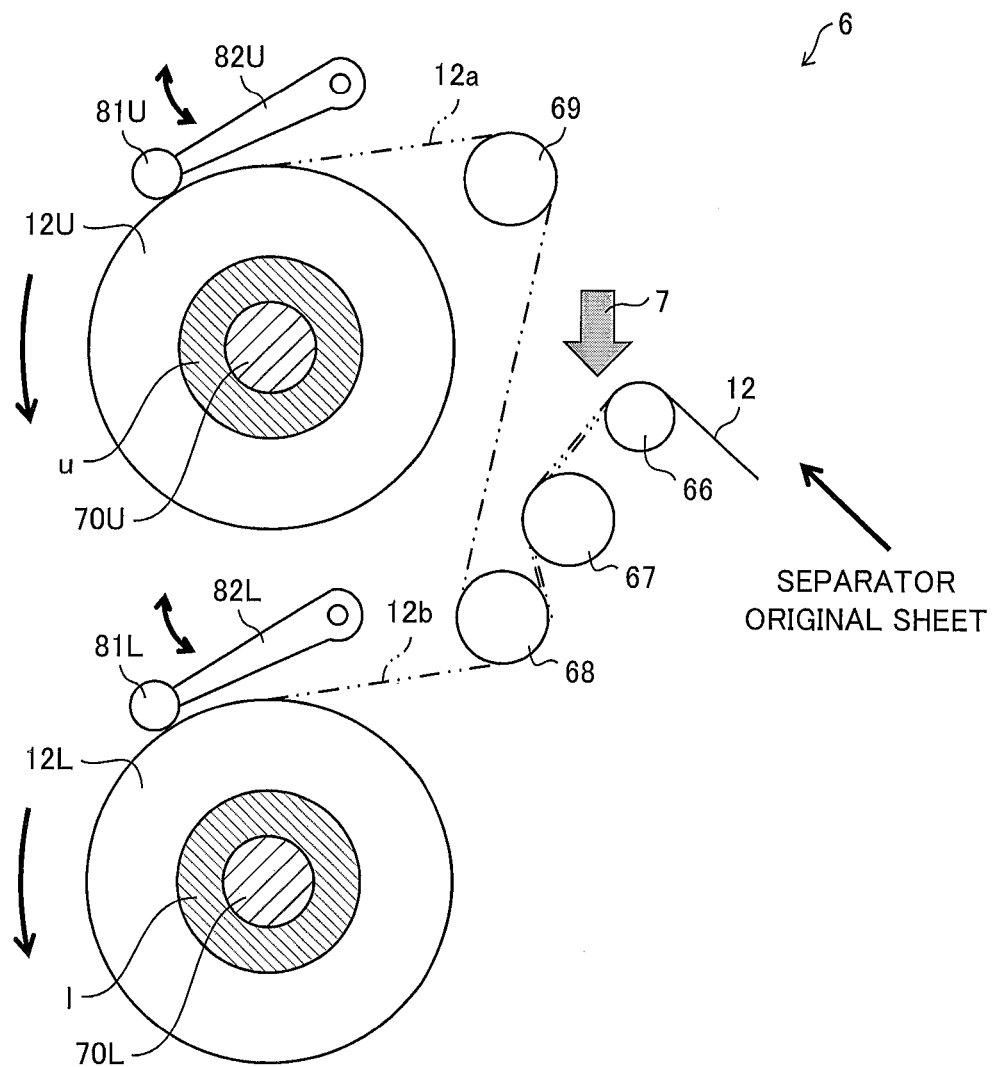
FIG. 6 is an enlarged view of the range C in FIG. 4A and illustrates a slitting apparatus in accordance with an embodiment of the present invention.

FIG. 6 is an enlarged view illustrating the range C in the slitting apparatus illustrated in FIG. 4A. The slitting apparatus 6 includes rollers 66 and 67, a direction changing roller 68, a take-up assisting roller 69, a first touch roller 81U, a second touch roller 81L, a first arm 82U, a second arm 82L, a first take-up roller 70U, a second take-up roller 70L, and a plurality of cutting devices 7. The first touch roller 81U and the second touch roller 81L are rotatably provided at respective one ends of the first arm 82U and the second arm 82L. Each of the first arm 82U and the second arm 82L can rotationally swing around an axis located at the other end thereof.

An original sheet of a separator 12 which is long and has been conveyed is slit into a plurality of slit separators by the plurality of cutting devices 7 (slitting section) on, for example, an upstream side or a downstream side of the roller 66 (slitting step). Hereinafter, among the plurality of slit separators arranged side by side, each of odd-numbered slit separators is referred to as "first separator 12a", and each of even-numbered slit separators is referred to as "second separator 12b". The first separator 12a and the second separator 12b are conveyed to the direction changing roller 68 via the roller 67.

A holding angle of the first separator 12a on the direction changing roller 68 is different from a holding angle of the second separator 12b on the direction changing roller 68. Here, the holding angle means an angle of an arc, on which the separator makes contact with the roller, with respect to an axis of the roller. That is, directions in which a separator is conveyed before and after a roller vary by a holding angle of the roller. The direction changing roller 68 (i) changes a conveying direction of the first separator 12a toward a first take-up roller 70U side and (ii) changes a conveying direction of the second separator 12b toward a second take-up roller 70L side (direction changing step). The first separator 12a and the second separator 12b are to be conveyed in different directions by the direction changing roller 68.

The first take-up roller 70U (first take-up section) is provided with one or more cores u in a removable manner, depending on the number of the first separator(s) 12a. Similarly, the second take-up roller 70L (second take-up section) is provided with one or more cores 1 in a removable manner, depending on the number of the second separator(s) 12b.

The second separator 12b which has been conveyed toward the second take-up roller 70L side by the direction changing roller 68 is wound on the core 1, so that a second separator roll 12L is formed. The second take-up roller 70L rotates together with the core 1 so as to take up the second separator 12b (taking-up step).

The first separator 12a which has been conveyed toward the first take-up roller 70U side by the direction changing roller 68 is directed to the first touch roller 81U via the take-up assisting roller 69 (conveying step). The first separator 12a is wound on the core u, so that a first separator roll 12U is formed. The first take-up roller 70U rotates together with the core u so as to take up the first separator 12a (taking-up step). The core can be removed from the take-up roller together with the separator roll that has been thus wound on the core.

The first touch roller 81U and the second touch roller 81L press respective of the first separator 12a and the second separator 12b toward take-up surfaces (front surfaces) of respective of the first separator roll 12U and the second separator roll 12L which are being wound (pressing step). Here, the first touch roller 81U and the second touch roller 81L press respective of the first separator 12a and the second separator 12b by their own weights. By thus pressing the first separator 12a and the second separator 12b by respective of the first touch roller 81U and the second touch roller 81L, it is possible to inhibit wrinkles and the like caused in the first separator 12a and the second separator 12b which are wound. Note that positions of the first touch roller 81U and the second touch roller 81L vary depending on changes in diameter of the first separator roll 12U and the second separator roll 12L so as to make contact with the respective take-up surfaces of the first separator roll 12U and the second separator roll 12L.

The first take-up roller 70U and the second take-up roller 70L are provided in respective different positions so that the separator rolls 12U and 12L which have been wound on the respective cores u and 1 do not make contact with each other. The first separator 12a and the second separator 12b are formed by slitting a single original sheet of separator, and therefore there is substantially no gap between the separator rolls 12U and 12L which are adjacent to each other in the transverse direction (TD). In a case where lateral surfaces (which are perpendicular to the shaft) of the separator rolls 12U and 12L make contact with each other, a scratch or fluff may occur on the lateral surfaces. In view of this, the first take-up roller 70U and the second take-up roller 70L are arranged far enough to a degree that the lateral surfaces of respective of the separator rolls 12U and 12L do not make contact with each other. In this case, the first take-up roller 70U and the second take-up roller 70L are arranged to have a positional relation of above and below in the slitting apparatus 6. By thus arranging the first take-up roller 70U and the second take-up roller 70L in the positional relation of above and below, it is possible to reduce a size of the slitting apparatus 6 in a horizontal direction. The first take-up roller 70U and the second take-up roller 70L do not need to be aligned in a vertical direction, and the "positional relation of above and below" indicates a positional relation in which the first take-up roller 70U and the second take-up roller 70L are not horizontally aligned.

The first take-up roller 70U and the second take-up roller 70L are arranged apart from each other by a predetermined distance. By this restriction of arrangement, a roller-to-roller distance from the direction changing roller 68 to any one of the first touch roller 81U and the second touch roller 81L becomes relatively long. Here, the roller-to-roller distance means a distance (i) between two adjacent rollers on a conveying route of a separator and (ii) from a position at which the separator is off from an upstream one of the two rollers on the conveying route to a position at which the separator makes contact with a downstream one of the two rollers. In a case where a roller-to-roller distance from a roller immediately before the touch roller to the touch roller is long, the separator is more likely to be deformed or to meander, and consequently the separator which is wound tends to have a wrinkle or misaligned winding. For example, in a case where the take-up assisting roller 69 is not provided, a roller-to-roller distance from the direction changing roller 68 to the first touch roller 81U becomes long, and therefore a wrinkle or misaligned winding is more likely to occur in the first separator 12a which is wound. Here, the wrinkle indicates, for example, a wrinkle which occurs in the take-up surface of the separator roll (i.e., in a curved surface with which the touch roller makes contact). The misaligned winding indicates that a part of a separator is misaligned in an axis direction of a columnar separator roll. In a case where misaligned winding has been caused, lateral surfaces (which are perpendicular to the shaft) of the separator roll become uneven. Note that a separator (e.g., a heat-resistant separator) which is formed by coating a porous film with a layer such as a heat-resistant layer is more likely to be curled in the transverse direction. Under the circumstances, in order to inhibit a wrinkle caused by the curl, it is necessary to shorten a roller-to-roller distance to the touch roller. Moreover, in a case where the thickness of the separator is thin, a wrinkle easily occurs.

In view of this, the take-up assisting roller 69 is provided between the direction changing roller 68 and the first touch roller 81U on the conveying route in order to shorten the roller-to-roller distance to the first touch roller 81U. The take-up assisting roller 69 does not make contact with the first separator roll 12U. In this case, the take-up assisting roller 69 is arranged so that the roller-to-roller distance to the first touch roller 81U becomes identical with the roller-to-roller distance from the direction changing roller 68 to the second touch roller 81L. Moreover, an angle at which the first separator 12a is introduced from the take-up assisting roller 69 to the first take-up roller 70U can be identical with an angle at which the second separator 12b is introduced from the direction changing roller 68 to the second take-up roller 70L. Moreover, for example, a positional relation of the take-up assisting roller 69, the first touch roller 81U, and the first take-up roller 70U can be identical with a positional relation of the direction changing roller 68, the second touch roller 81L, and the second take-up roller 70L. This makes it possible to take up the first separator 12a and the second separator 12b under the same condition. From this, it is possible to prevent a difference between the first separator roll 12U and the second separator roll 12L in terms of wound-up state (i.e., quality such as a wrinkle and misaligned winding). Note that the direction changing roller 68, the take-up assisting roller 69, the first take-up roller 70U, and the second take-up roller 70L are separated from the first touch roller 81U and the second touch roller 81L. That is, during production of the separator roll, positions of the direction changing roller 68, the take-up assisting roller 69, the first take-up roller 70U, and the second take-up roller 70L are fixed. Only the first touch roller 81U and the second touch roller 81L need to be attached to the first arm 82U and the second arm 82L, respectively, as rollers. This makes it possible to simplify configurations of the first arm 82U and the second arm 82L which are movable parts.

By thus providing the take-up assisting roller 69, the roller-to-roller distance between the first touch roller 81U and a roller immediately before the first touch roller 81U is shortened, and it is therefore possible to inhibit a wrinkle or misaligned winding caused in the first separator roll 12U. Moreover, the direction changing roller 68 is provided at a position that is nearer to the second touch roller 81L than to the first touch roller 81U (i.e., at a position at which the roller-to-roller distance becomes shorter). From this, it is possible to omit another take-up assisting roller to be provided between the second touch roller 81L and the direction changing roller 68.

Note that, in order to shorten the conveying distance between the take-up position of the first separator roll 12U and the take-up assisting roller 69 as much as possible, the take-up assisting roller 69 can be a fixed member (i.e., a roller whose position is fixed) which is provided nearest to the first take-up roller 70U in a radial direction. In this case, a maximum outer diameter of the first separator roll 12U that can be wound on the first take-up roller 70U is not restricted by the first touch roller 81U or the axis of the first arm 82U but is restricted by the take-up assisting roller 69. For example, in a case where a distance from a center of the first take-up roller 70U to a surface of the take-up assisting roller 69 is 300 mm, a maximum outer diameter of the first separator roll 12U is restricted to 600 mm. Note that, in order to obtain a greater maximum outer diameter, it is preferable that the diameter of the take-up assisting roller 69 is small. For example, the diameter of the take-up assisting roller 69 can be 60 mm or more and 100 mm or less, by taking into consideration rigidity and the like. Similarly, the direction changing roller 68 can be a fixed member (i.e., a roller whose position is fixed) which is provided nearest to the second take-up roller 70L in a radial direction. In this case, a maximum outer diameter of the second separator roll 12L that can be wound on the second take-up roller 70L is restricted by the direction changing roller 68.

The first touch roller 81U presses the first separator 12a by its own weight, and therefore the first touch roller 81U is provided on an upper side of the first take-up roller 70U. Meanwhile, the direction changing roller 68 which is provided for changing the conveying direction of the first separator 12a that has been slit by the cutting device 7 toward the first take-up roller 70U side (upper side) may be provided on a lower side of the first take-up roller 70U due to restriction of a size of the slitting apparatus 6. In a case where the first separator 12a is introduced to the first take-up roller 70U directly from the direction changing roller 68 that is located on the lower side of the first take-up roller 70U, a distance becomes long which is from (i) a position at which the first separator 12a makes contact with the take-up surface to (ii) the first touch roller 81U that is located on the upper side of the first take-up roller 70U. As a result, a wrinkle is more likely to occur in the take-up surface.

In view of this, the take-up assisting roller 69 is provided on the upper side of the first take-up roller 70U, and this makes it possible to introduce the first separator 12a to the take-up surface from a height of the upper side of the take-up surface. From this, it is possible to shorten a distance from the position at which the first separator 12a makes contact with the take-up surface of the first separator roll 12U to the first touch roller 81U. This makes it possible to inhibit a wrinkle or misaligned winding caused in the first separator roll 12U. Here, heights of the rollers are compared to each other at positions at which conveyed separators respectively pass through. A height of an upper end of the take-up assisting roller 69 (i.e., a highest point of an arc with which the first separator 12a makes contact) only needs to be upper than the upper end of the core u that is provided on the first take-up roller 70U. Moreover, a height of a lower end of the direction changing roller 68 (i.e., a lowest point of an arc with which the first separator 12a makes contact) only needs to be lower than (i) the upper end of the first take-up roller 70U or (ii) the upper end of the core u that is provided on the first take-up roller 70U. As winding continues, the diameter of the first separator roll 12U becomes larger, and therefore the position of the take-up surface becomes higher. However, provided that the rollers satisfy the above described conditions, the first separator 12a can be introduced to the take-up surface from the height upper than the take-up surface during at least the diameter of the first separator roll 12U is within the predetermined range. Further it is preferable that production of the first separator roll 12U is completed while the upper end of the first separator roll 12U is lower than the upper end of the take-up assisting roller 69. The first separator roll 12U which has been completely produced is removed from the first take-up roller 70U together with the core u.

Similarly, a height of the lower end of the direction changing roller 68 (i.e., a lowest point of an arc with which the first separator 12a makes contact) is preferably upper than the upper end of the core 1 provided on the second take-up roller 70L.

Note that it is possible to employ a configuration in which a position of the first touch roller 81U is shifted toward the take-up assisting roller 69 so that the first separator 12a conveyed from the take-up assisting roller 69 makes contact with the first touch roller 81U before contacting with the take-up surface of the first separator roll 12U. The same applies to the second touch roller 81L. From this, it is possible to press separators onto the respective take-up surfaces while stretching wrinkles in the separators on surfaces of the first touch roller 81U and the second touch roller 81L.

Note that the first touch roller 81U can be configured to press the first separator 12a onto the take-up surface from a lateral side or a lower side of the first separator roll 12U. In this case, for example, the slitting apparatus 6 can be provided with a mechanism such as a spring or an air cylinder for applying force to the first arm 82U. The same applies to the second touch roller 81L.

According to the present embodiment, the effect of inhibiting a wrinkle or misaligned winding is particularly suitable for a separator that is used in a battery. A separator (in particular, a separator coated with a layer) tends to have uneven film thickness distribution, and therefore a wrinkle or misaligned winding is more likely to occur when taking up the separator. Meanwhile, in a case where a wrinkle or misaligned winding is caused in a separator roll, the separator easily meanders when the separator is wound off in a battery production process. In a case where the separator meanders, defect is caused in lamination of a positive electrode film and a negative electrode film between which the separator is provided. As such, the separator roll is highly demanded to have less wrinkles and less misaligned winding, and it is therefore necessary to provide the take-up assisting roller 69. The present embodiment is applicable (i) to a single-layer separator that does not have a heat-resistant layer and (ii) also to a heat-resistant separator having a heat-resistant layer.

Embodiment 2

The following description will discuss another embodiment of the present invention. Note that, for convenience of explanation, identical reference numerals are given to members which have respective functions identical with those described in Embodiment 1, and descriptions of the respective members are omitted.

Figure 7:
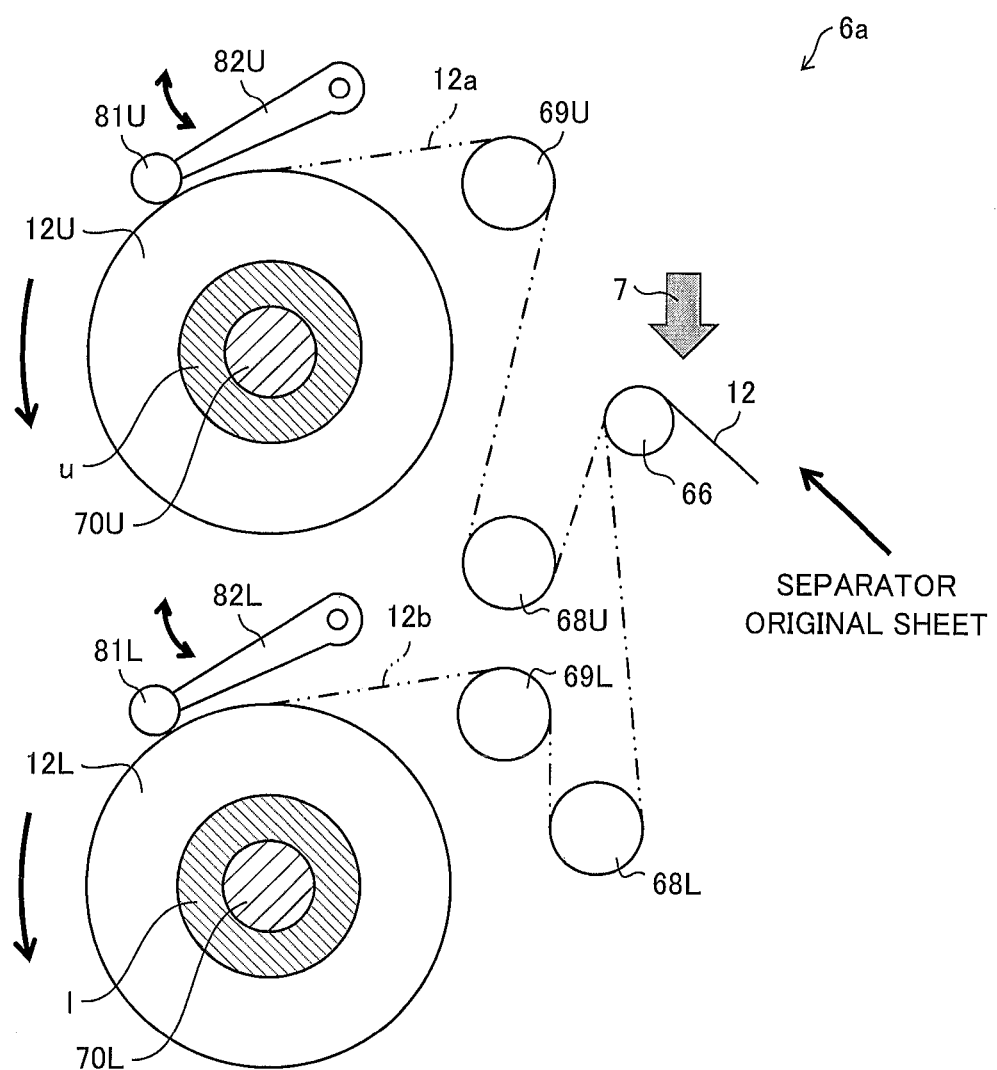
FIG. 7 is an enlarged view partially illustrating a slitting apparatus in accordance with another embodiment of the present invention.

FIG. 7 is an enlarged view partially illustrating a slitting apparatus 6*a* in accordance with the present embodiment, as with FIG. 6. The slitting apparatus 6*a* includes a roller 66, a first direction changing roller 68U, a second direction changing roller 68L, a first take-up assisting roller 69U, a second take-up assisting roller 69L, a first touch roller 81U, a second touch roller 81L, a first arm 82U, a second arm 82L, a first take-up roller 70U, a second take-up roller 70L, and a plurality of cutting devices 7.

An original sheet of a separator 12 which has been conveyed is slit into a plurality of slit separators (first separators 12*a* and second separators 12*b*) by the plurality of cutting devices 7 (slitting section) on, for example, an upstream side of the roller 66. The first separator 12*a* and the second separator 12*b* are to be conveyed in different directions by the roller 66.

A lower end of the first direction changing roller 68U is located lower than an upper end of the roller 66 and an upper end of a core u that is provided on the first take-up roller 70U. The first direction changing roller 68U is provided for changing the conveying direction of the first separator 12*a* toward an upper side (i.e., first take-up roller 70U side).

An upper end of the first take-up assisting roller 69U is located upper than a lower end of the first direction changing roller 68U and an upper end of a core u that is provided on the first take-up roller 70U. The first take-up assisting roller 69U is provided, on a conveying route, between the first touch roller 81U and the first direction changing roller 68U so as to shorten a roller-to-roller distance between the first touch roller 81U and a roller immediately before the first touch roller 81U. The first take-up assisting roller 69U is provided to introduce the first separator 12*a* to the take-up surface from a height upper than the take-up surface.

A lower end of the second direction changing roller 68L is located lower than an upper end of the roller 66, an upper end of the second take-up roller 70L, and an upper end of a core 1 that is provided on the second take-up roller 70L. The second direction changing roller 68L is provided to change a conveying direction of the second separator 12*b* toward an upper side (i.e., second take-up roller 70L side).

An upper end of the second take-up assisting roller 69L is located upper than the lower end of the second direction changing roller 68L and the upper end of the core 1 that is provided on the second take-up roller 70L. The second take-up assisting roller 69L is provided, on a conveying route, between the second touch roller 81L and the second direction changing roller 68L so as to shorten a roller-to-roller distance between the second touch roller 81L and a roller immediately before the second touch roller 81L. The second take-up assisting roller 69L is provided to introduce the second separator 12*b* to a take-up surface from a height upper than the take-up surface.

The first take-up assisting roller 69U and the second take-up assisting roller 69L are arranged so that the roller-to-roller distance to the first touch roller 81U becomes identical with the roller-to-roller distance to the second touch roller 81L.

A positional relation of the first take-up assisting roller 69U, the first touch roller 81U, and the first take-up roller 70U can be identical with a positional relation of the second take-up assisting roller 69L, the second touch roller 81L, and the second take-up roller 70L. Moreover, immediately before the first touch roller 81U and the second touch roller 81L, the first separator 12*a* and the second separator 12*b* are conveyed on upper sides of the first take-up assisting roller 69U and the second take-up assisting roller 69L, respectively. This makes it possible to take up the first separator 12*a* and the second separator 12*b* under the same condition. Note that, during production of the separator roll, positions of the first direction changing roller 68U, the second direction changing roller 68L, the first take-up assisting roller 69U, the second take-up assisting roller 69L, the first take-up roller 70U, and the second take-up roller 70L are fixed.

By thus providing the first take-up assisting roller 69U and the second take-up assisting roller 69L, the roller-to-roller distance between each of the first touch roller 81U and the second touch roller 81L and a roller immediately before the each of the first touch roller 81U and the second touch roller 81L is shortened, and it is therefore possible to inhibit wrinkles or misaligned winding caused in the first separator roll 12U and the second separator roll 12L. Moreover, by providing the second take-up assisting roller 69L, it is possible to increase a degree of freedom of the position at which the second direction changing roller 68L is provided.

Modification Example

According to Embodiment 2, each of the first take-up assisting roller 69U and the second take-up assisting roller 69L can be a concave roller such as a reverse crown roller. The concave roller is a roller having a shape in which an outer diameter of its center part in the transverse direction (TD) is smaller than outer diameters of its both end parts. From this, a separator that is conveyed is stretched at the both end parts of the rotating concave roller, and it is thus possible to stretch a wrinkle which has been caused in the separator during the conveying. It is necessary to take up the separator while a wrinkle is stretched, and it is therefore preferable that rollers (first take-up assisting roller 69U and second take-up assisting roller 69L) immediately before the first touch roller 81U and the second touch roller 81L are concave rollers. The concave roller can have a curved shape in which the outer diameter gradually becomes larger toward the both end parts, a straight line shape, or a shape in which the outer diameter becomes larger step-by-step toward the both end parts.

Note, however, that it is preferable to provide one (1) concave first take-up assisting roller 69U for one (1) first separator 12*a* and one (1) core u. In a case where a plurality of sets of the first separator 12*a* and the core u are arranged side by side, a plurality of concave first take-up assisting rollers 69U can be provided for the respective plurality of sets. Note that the plurality of first take-up assisting rollers 69U can include both a concave roller and a columnar roller that is not concave but is flat. Alternatively, in a case where one (1) first take-up assisting roller 69U conveys a plurality of first separators 12a, a surface of the first take-up assisting roller 69U can have a plurality of concave portions at positions corresponding to the respective plurality of first separators 12a. The same applies to the second take-up assisting roller 69L.

Note that, in Embodiment 1, for example, the direction changing roller 68 and the take-up assisting roller 69 immediately before the first touch roller 81U and the second touch roller 81L can be concave rollers. In a case where a direction changing roller 68 having a concave shape is employed, the direction changing roller 68 can have a plurality of concave portions at positions corresponding to a plurality of first separators 12a and second separators 12b, as with the first take-up assisting roller 69U described above.

[Main Points]

The method in accordance with an aspect of the present invention for producing a separator roll includes the steps of: (a) slitting an original sheet of a battery separator in a lengthwise direction so as to divide the original sheet into at least a first separator and a second separator; (b) changing conveying directions of the first separator and the second separator by at least one direction changing roller toward a first take-up section and a second take-up section, respectively; (c) taking up the first separator and the second separator by the first take-up section and the second take-up section, respectively, the first take-up section and the second take-up section being arranged in a positional relation of above and below; (d) pressing the first separator and the second separator, which are being wound, onto respective take-up surfaces by a first touch roller and a second touch roller, respectively; and (e) conveying the first separator via a first take-up assisting roller which is provided between the direction changing roller and the first touch roller so as to shorten a roller-to-roller distance to the first touch roller.

The first take-up section and the second take-up section are arranged in a positional relation of above and below, and therefore a roller-to-roller distance to one of the touch rollers tends to become long. In a case where the roller-to-roller distance to the touch roller is long, a wrinkle or misaligned winding is more likely to be caused in the separator to be wound.

According to the configuration, the first take-up assisting roller is provided between the direction changing roller and the first touch roller so as to shorten the roller-to-roller distance to the first touch roller. This makes it possible to inhibit a wrinkle or misaligned winding caused in the first separator. Note that the "roller-to-roller distance" means a distance (i) between two adjacent rollers on a conveying route of a separator and (ii) from a position at which the separator is off from an upstream one of the two rollers on the conveying route to a position at which the separator makes contact with a downstream one of the two rollers. Moreover, the "positional relation of above and below" means a positional relation of being not horizontally aligned (i.e., being positioned above and below).

The direction changing roller can be provided at a position which is nearer to the second touch roller than to the first touch roller.

According to the configuration, the direction changing roller is provided at a position which is nearer to the second touch roller than to the first touch roller. From this, it is possible to omit providing a take-up assisting roller between the direction changing roller and the second touch roller.

It is possible that, in the step (e), the second separator is conveyed via a second take-up assisting roller which is provided between the direction changing roller and the second touch roller so as to shorten a roller-to-roller distance to the second touch roller.

According to the configuration, the first take-up assisting roller and the second take-up assisting roller are provided, and it is therefore possible to enhance a degree of freedom relating to arrangement of the direction changing roller.

The take-up assisting roller can be provided such that a roller-to-roller distance to the first touch roller becomes identical with a roller-to-roller distance to the second touch roller.

According to the configuration, it is possible to prevent a difference in wound state from occurring between a roll of the first separator and a roll of the second separator.

The first take-up assisting roller can be provided separately from the first touch roller.

According to the configuration, it is possible to simplify a configuration of a movable part including the first touch roller.

It is possible to employ a configuration in which, in the step (d), the first touch roller presses, from an upper side, the first separator which is being wound; and in the step (e), the first take-up assisting roller introduces the first separator to the take-up surface from a height that is upper than the take-up surface.

According to the configuration, it is possible to shorten a distance from a position at which the first separator makes contact with the take-up surface of the roll to the first touch roller (i.e., a distance along the separator). This makes it possible to inhibit a wrinkle or misaligned winding caused in the take-up surface.

It is possible to employ a configuration in which, in the step (b), the first separator passes through a lower side of the direction changing roller; in the step (c), the first separator is wound on a core that is attached to the first take-up section; and a lower end of the direction changing roller is located lower than an upper end of the core.

According to the configuration, it is possible to shorten a distance from a position at which the first separator makes contact with the take-up surface of the roll to the first touch roller, as compared with a case where the first separator is introduced directly from the direction changing roller to the core on the first take-up section. This makes it possible to inhibit a wrinkle or misaligned winding caused in the take-up surface.

It is possible to employ a configuration in which, in the step (e), the first separator passes through an upper side of the first take-up assisting roller; and production of a first separator roll which is a roll of the first separator is completed within a range in which an upper end of the first separator roll formed on the first take-up section is located lower than an upper end of the first take-up assisting roller.

According to the configuration, it is possible to constantly introduce the first separator from the upper side to the take-up surface, regardless of the outer diameter of the roll of the first separator.

The method in accordance with an aspect of the present invention for slitting a separator includes the steps of: (A) slitting an original sheet of a battery separator in a lengthwise direction so as to divide the original sheet into at least a first separator and a second separator; (B) changing conveying directions of the first separator and the second separator by at least one direction changing roller toward a first take-up section and a second take-up section, respectively; (C) taking up the first separator and the second separator by the first take-up section and the second take-up section, respectively, the first take-up section and the second take-up section being arranged in a positional relation of above and below; (D) pressing the first separator and the second separator, which are being wound, onto respective take-up surfaces by a first touch roller and a second touch roller, respectively; and (E) conveying the first separator via a first take-up assisting roller which is provided between the direction changing roller and the first touch roller so as to shorten a roller-to-roller distance to the first touch roller.

The present invention is not limited to the embodiments, but can be altered by a skilled person in the art within the scope of the claims. An embodiment derived from a proper combination of technical means each disclosed in a different embodiment is also encompassed in the technical scope of the present invention.

INDUSTRIAL APPLICABILITY

The present invention can be used in a slitting apparatus, a method for producing a separator roll, and the like.

REFERENCE SIGNS LIST

1: Lithium-ion secondary battery
4: Heat-resistant layer
5: Porous film
6, 6a: Slitting apparatus
7: Cutting device
12, 12a, 12b: Separator, first and second separators
12U, 12L: First and second separator rolls
68, 68U, 68L: First and second direction changing rollers
69U, 69L: First and second take-up assisting rollers
70U, 70L: First and second take-up rollers (first and second take-up sections)
81U, 81L: First and second touch rollers
82U, 82L: First and second arms
1, u: Core

The invention claimed is:

1. A method for producing a separator roll, said method comprising the steps of:
slitting an original sheet of a lithium ion secondary battery separator in a lengthwise direction so as to divide the original sheet into at least a first separator and a second separator;
by a direction changing roller, separating a convey route of the first separator and the second separator into a first route toward a first take-up section and a second route toward a second take-up section, respectively, and changing conveying directions of the first separator and the second separator toward the first take-up section and the second take-up section, respectively;
taking up the first separator and the second separator by rotation of the first take-up section and rotation of the second take-up section, respectively;
pressing the first separator and the second separator, which are being wound, onto respective take-up surfaces of the first take-up section and the second take-up section by a first touch roller and a second touch roller, respectively, the first touch roller and the second touch roller being provided oppositely to the direction changing roller with respect to a plane including respective rotational centers of the first take-up section and the second take-up section; and
conveying the first separator via a first take-up assisting roller which is provided in the first route so as to shorten a roller-to-roller distance to the first touch roller,
in the step of pressing, the first touch roller pressing, from an upper side, the first separator which is being wound; and
in the step of conveying, the first take-up assisting roller introducing the first separator to the take-up surface from a height that is higher than the take-up surface,
the first touch roller and the second touch roller being rotatably provided at one ends of respective first and second arms, the first and second arms being provided so as to swing around the other ends of the respective first and second arms, and
the first touch roller and the second touch roller pressing, by their own weights, the first separator and the second separator onto the respective take-up surfaces of the first take-up section and the second take-up section.

2. The method as set forth in claim 1, wherein:
in the step of changing, the first separator passes through a lower side of the direction changing roller or the first direction changing roller;
in the step of taking up, the first separator is wound on a core that is attached to the first take-up section; and
a lower end of the direction changing roller or the first direction changing roller is located lower than an upper end of the core.

3. The method as set forth in claim 1, wherein:
in the step of conveying, the first separator passes through an upper side of the first take-up assisting roller; and
production of a first separator roll which is a roll of the first separator is completed within a range in which an upper end of the first separator roll formed on the first take-up section is located lower than an upper end of the first take-up assisting roller.

* * * * *